US006300721B1

United States Patent
Duve et al.

(10) Patent No.: US 6,300,721 B1
(45) Date of Patent: Oct. 9, 2001

(54) PHOTOCONTROL ARRANGEMENT WITH MECHANICALLY HELD CONTACTS FOR CONTROLLING AN OUTDOOR LIGHTING SYSTEM

(75) Inventors: George Duve, Washington, NJ (US); John Edward Mills, Simsbury, CT (US)

(73) Assignee: Area Lighting Research, Inc., Hackettstown, NJ (US)

( * ) Notice: Subject to any disclaimer, the term of this patent is extended or adjusted under 35 U.S.C. 154(b) by 0 days.

(21) Appl. No.: 09/663,221

(22) Filed: Sep. 15, 2000

(51) Int. Cl.[7] .................................................. H05B 37/02
(52) U.S. Cl. ......................... 315/149; 315/156; 315/157; 315/159

(58) Field of Search ..................................... 315/159, 156, 315/157, 149

(56) References Cited

U.S. PATENT DOCUMENTS 4,451,763 * 5/1984 Sodini .................................. 315/159

* cited by examiner

Primary Examiner—David Vu
(74) Attorney, Agent, or Firm—Kirschstein, et al.

(57) ABSTRACT

A photocontrol arrangement for operating an outdoor lighting system includes a stepper relay whose contacts are mechanically held together or apart, and which is electrically energized briefly only during the generation of a pulse, for minimizing electrical energy usage and reducing overheating.

7 Claims, 1 Drawing Sheet

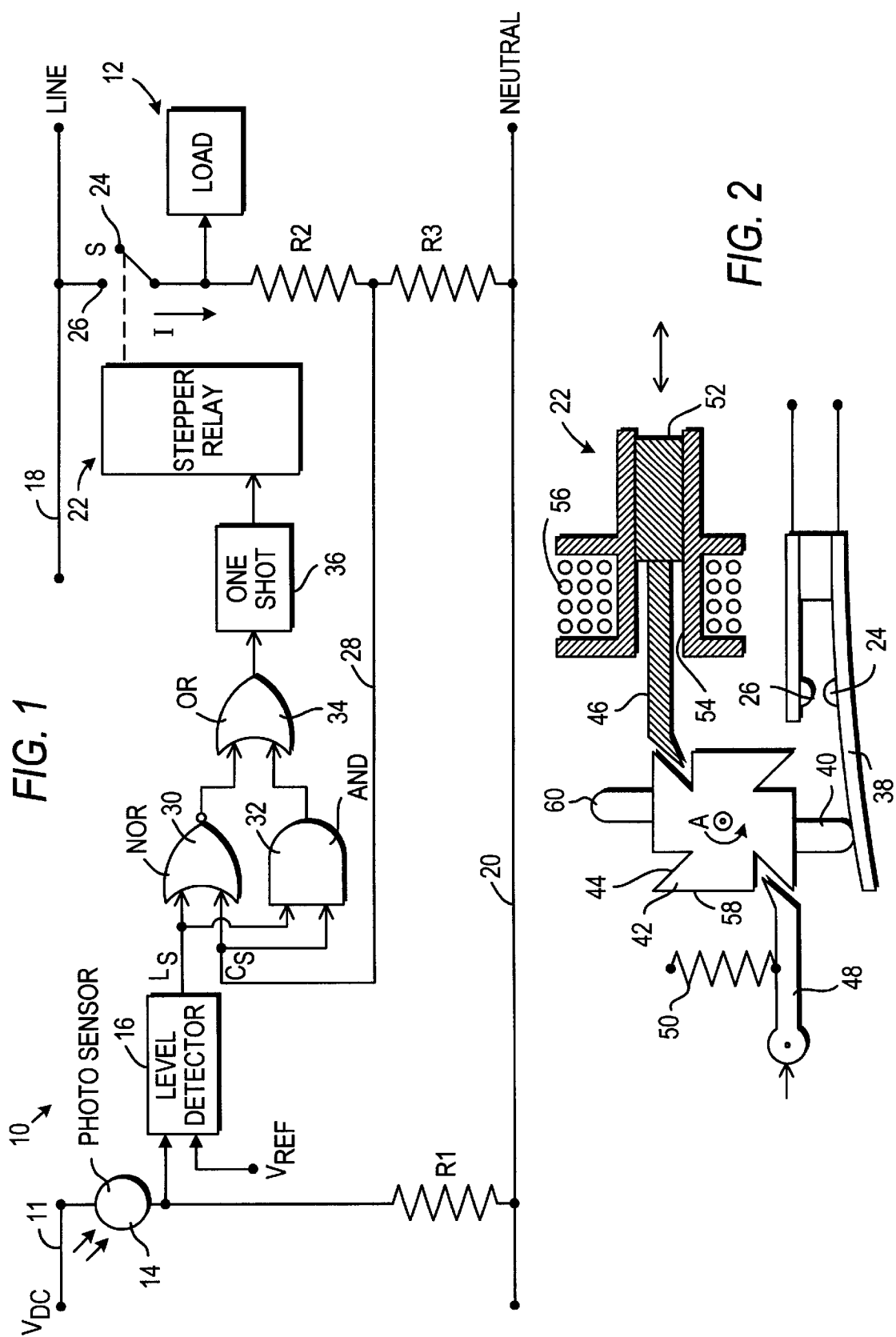

PHOTOCONTROL ARRANGEMENT WITH MECHANICALLY HELD CONTACTS FOR CONTROLLING AN OUTDOOR LIGHTING SYSTEM

BACKGROUND OF THE INVENTION

1. Field of the Invention

The present invention relates to outdoor lighting controls and, more particularly, to reducing electrical energy usage and increasing the life span and durability of such controls.

2. Description of the Related Art

A conventional photocontrol arrangement employs a photosensor for detecting outdoor ambient light and for converting the detected light into an analog electrical signal. A level detector converts the analog signal into a digital signal having high and low states corresponding to daylight and nighttime conditions, respectively. The digital signal is conducted to an electrical load switching relay which, in turn, switches the load, i.e., an outdoor lighting system, off during daylight, and on during nighttime.

The load relay used in all known photocontrol arrangements have a pair of contacts which are "electrically held", that is the contacts are held apart in an open state as long as the load relay is electrically energized by an electrical current conducted to a coil of the load relay. When this electrical current is discontinued, the load relay is not energized, and the contacts return to the closed state. A reverse arrangement is also possible when the contacts are held closed when the relay is energized.

In either event, the load relay is using electrical energy to hold the contacts together or apart, either all day long during one of the states, or all night long during the other of the states. This is not only wasteful of energy, but also can cause overheating, particularly in small photocontrol enclosures.

Moreover, electrically held relays generally operate over a wide range of input voltages, for example, 105V to 285V and, as a result, a voltage regulator is needed. This regulator also consumes non-negligible power.

OBJECTS OF THE INVENTION

Accordingly, it is a general object of the present invention to reduce electrical energy expenditure in such photocontrol arrangements.

More particularly, it is an object of the present invention to prevent overheating in photocontrol enclosures.

Still another object of the present invention is to increase the life span and durability of such photocontrol arrangements.

It is yet another object of the present invention to eliminate the voltage regulator in such arrangements.

SUMMARY OF THE INVENTION

In keeping with the above objects and others which will become apparent hereafter, one feature of the present invention resides in a photocontrol arrangement for controlling an outdoor lighting system. The arrangement includes a photosensor circuit having a photosensor responsive to ambient outdoor light for generating an analog electrical signal, and a level detector operative for converting the analog signal to a digital level signal having a low state or "dark" signal when the ambient light is below a threshold light level, and a high state or "light" signal when the ambient light equals or exceeds the threshold level.

The arrangement further includes a pulse-actuated, electrically energizable, stepper relay, also known as a mechanical or ratchet relay, operatively connected to the lighting system and having a pair of electrical contacts that engage each other in a closed state to conduct an electrical current to the lighting system to illuminate the same, and that are spaced apart from each other in an open state to prevent the electrical current from reaching the lighting system to extinguish the same. The contacts are either mechanically held together in the closed state, or mechanically held apart in the open state, or both.

A pulse generator circuit is operatively connected between the photosensor circuit and the stepper relay, and generates a pulse to actuate the relay to the closed state when the dark signal is generated, and generates another pulse to actuate the relay to the open state when the light signal is generated. Each pulse has a limited time duration during which the state of the relay is changed. The stepper relay is electrically energized during the limited time duration of each pulse to reduce electrical energy usage.

Preferably, the pulse generator circuit includes a monitor circuit for monitoring the state of the contacts of the relay, and for generating a contact signal having an open value in the open state, and a closed value in the closed state. A logic circuit generates the pulse upon simultaneous generation of the dark signal and the open value of the contact signal, and generates the other pulse upon simultaneous generation of the light signal and the closed value of the contact signal.

In accordance with this invention, a relay having mechanically held contacts only uses electrical energy when it is changing state and only during the limited time duration of a pulse. This contrasts with the known electrical relays having electrically held contacts which are energized and consume electrical energy throughout the duration of each state, i.e., all night long, or all day long. Concomitantly, the energy efficient relay of this invention does not heat up as the prior art relays and contributes to increasing the life span and durability of the arrangement.

Moreover, the present invention enables the relay to be made with a higher contact force to move the contacts, because a large amount of energy can be applied to the contacts for a short period of time without overheating the relay. This feature enables a larger electrical current to be switched, again without overheating the relay. Since the electrical pulse is only applied for a short time, on the order of a fraction of a second, the voltage regulator can be eliminated, again without overheating the relay.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic of a photocontrol arrangement for controlling an outdoor lighting system according to this invention; and FIG. 2 is a broken-away view of portions of a stepper relay used in the arrangement of FIG. 1.

DETAILED DESCRIPTION ON OF THE PREFERRED EMBODIMENT

Reference numeral 10 in FIG. 1 depicts a photocontrol arrangement for controlling a load 12, particularly an outdoor lighting system which is desired to be illuminated at dusk and stay lit during the night, and which is desired to be extinguished at dawn and stay off during the day. The arrangement 10 includes a photosensor circuit which includes a photosensor 14 responsive to ambient outdoor light for generating an analog electrical signal, and a level detector 16 having one input to which the analog signal is applied, and another input to which a reference voltage $V_{REF}$ is applied. The photosensor 14 is connected to a low DC voltage $V_{DC}$ between a voltage line 11 and a neutral 20 line by a resistor R1. The detector 16 converts the analog signal to an electrical digital signal, also known as a level signal $L_S$, having a high value (logic 1) when the ambient light equals or exceeds the reference or threshold voltage during daytime, and a low value (logic 0) when the ambient light is less than the threshold voltage during nighttime.

The load 12 is switched on and off by a switch S which is switched between open and closed states, as described below, by a stepper relay 22. The switch has a movable contact 24 and a stationary contact 26. When the contacts engage each other in the closed state, an electrical current 1 flows from a main power AC line 18 through the switch S to the load to turn the load on. When the contacts are spaced apart in the open state, as shown, the current does not reach the load, and the load is turned off.

A monitor circuit, consisting of resistors R2, R3 connected in series with the switch between line 18 and neutral 20, is operative for monitoring the state of the contacts 24, 26. A monitor tap 28 is connected to the junction between the resistors R2, R3, and a contact signal $C_S$ has a high value in the closed state because the current flowing through the switch also flows along the monitor tap, and a low value in the open state because no current flows through the switch or along the monitor tap.

A logic circuit processes the values of the level signal $L_S$ and the contact signal $C_S$. The level and contact signals are simultaneously fed to the twin inputs of a NOR gate 30 and an AND gate 32, both of whose outputs are conducted to an OR gate 34 to trigger a pulse generator such as a one shot multivibrator 36 operative for generating a pulse whenever it receives a trigger signal from the OR gate 34.

The logic circuit works as follows:

1. If the level signal has a low value (dark signal or nighttime condition) and if the contact signal has a high value (closed state), then there is no output trigger signal, and no pulse is generated by the generator 36.

2. If the level signal has a low value (dark signal or nighttime condition) and if the contact signal has a low value (open state), then there is a trigger signal, and a pulse is generated by the generator 36.

3. If the level signal has a high value (light signal or daytime condition) and if the contact signal has a low value (open state), then there is no output trigger signal, and no pulse is generated by the generator 36.

4. If the level signal has a high value (light signal or daytime condition) and if the contact signal has a high value (closed state), then there is a trigger signal, and a pulse is generated by the generator 36.

Each pulse exists for a limited time, e.g., a fraction, for example, one-third, of a second. Each pulse is conducted to the stepper relay 22 to energize the same.

FIG. 2 depicts the stepper relay 22, also known as a ratchet or a mechanical relay, in more detail. The aforementioned movable contact 24 is mounted on a resilient arm 38 and, as shown, the movable contact 24 is mechanically held away from the stationary contact 26 by a cam 40 mounted on a ratchet wheel 42 for joint rotation therewith. The wheel 42 has a plurality of teeth 44 into one of which a drive pawl 46 is engaged, and into another of which a locking pawl 48 tensioned by a return spring 50 is engaged. The drive pawl 46 is connected to a magnetic slug 52 mounted for sliding movement along a passage 54 which extends through an electromagnetic coil 56.

In operation, when a pulse from generator 36 energizes the coil 56, the slug 52 and the drive pawl 46 move along the passage 54 and cause the ratchet wheel 42 to rotate in direction of arrow A against the restoring force of the tensioned pawl 48 for a distance or step until the pawl 48 engages the next tooth 44 on the wheel 42. The cam 40 participates in this rotation and, as shown, pushes the resilient arm 38 and the contact 24 away from the contact 26 and holds the contacts apart until the next pulse is received. The pawl 48 prevents the wheel 42 from turning in the opposite direction or moving until the next pulse.

In the preferred embodiment, the ratchet wheel 42 has four teeth 44 separated by four lands or flats 58. The cam 40 is located on one of the flats, no cam is located on the next successive flat, another cam 60 is located on the next flat, and no cam is located on the next successive flat, all as considered along the direction of rotation. Hence, the closed and open states of the contacts 24, 26 alternate with each successive pulse.

It will therefore be seen that the stepper relay is only electrically energized during each pulse, and not energized between pulses, thereby considerably reducing electrical energy usage. The contacts 24, 26 are mechanically held in the open or closed states. Overheating of the photocontrol arrangement due to less power usage is avoided.

It will be understood that each of the elements described above, or two or more together, may also find a useful application in other types of constructions differing from the type described above.

While the present invention has been described and illustrated herein as embodied in a photocontrol arrangement with mechanically held contacts for controlling an outdoor lighting system, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

What is claimed is:

1. A photocontrol arrangement for controlling an outdoor lighting system, comprising:

a) a photosensor circuit responsive to ambient outdoor light for generating a dark electrical signal when the ambient light is below a threshold light level, and a light electrical signal when the ambient light at least equals the threshold light level;

b) a pulse-actuated, electrically energizable, stepper relay operatively connected to the lighting system and having a pair of electrical contacts that engage each other in a closed state to conduct an electrical current to the lighting system to illuminate the lighting system, and that are spaced apart from each other in an open state to prevent the electrical current from reaching the lighting system to extinguish the lighting system, the contacts being mechanically held in either of said states; and c) a pulse generator circuit operatively connected between the photosensor circuit and the stepper relay, for generating a pulse to actuate the relay to the closed state when the dark signal is generated, and for generating another pulse to actuate the relay to the open state when the light signal is generated, each pulse having a limited time duration during which the state of the relay is changed, the stepper relay only being electrically energized during said limited time duration of each pulse to reduce electrical energy usage.

2. The photocontrol arrangement of claim 1, wherein the photosensor circuit includes a photosensor for generating an electrical analog signal, and a level detector for converting the analog signal to a digital signal having a low value corresponding to the dark signal, and a high value corresponding to the light signal.

3. The photocontrol arrangement of claim 1, wherein the stepper relay includes a drive member for holding at least one of the contacts away from the other of the contacts in the open state.

4. The photocontrol arrangement of claim 3, wherein the drive member is a cam movable by a ratchet wheel having teeth, and a pawl is engaged in at least one of the teeth.

5. The photocontrol arrangement of claim 1, wherein the pulse generator circuit includes a monitor circuit for monitoring the state of the contacts of the relay, and for generating a contact signal having an open value in the open state, and a closed value in the closed state.

6. The photocontrol arrangement of claim 5, wherein the pulse generator circuit includes a logic circuit for generating the pulse upon simultaneous generation of the dark signal and the open value of the contact signal, and for generating the other pulse upon simultaneous generation of the light signal and the closed value of the contact signal.

7. The photocontrol arrangement of claim 6, wherein the pulse generator circuit includes a one shot multivibrator.

* * * * *